United States Patent Office 3,639,546
Patented Feb. 1, 1972

3,639,546
PROCESS FOR THE PRODUCTION OF PHOSPHATE ESTERS
William W. West, El Cerrito, Robert O. Bolt, San Rafael, and Chester D. Gordon, El Sobrante, Calif., assignors to Chevron Research Company, San Francisco, Calif.
No Drawing. Filed July 29, 1968, Ser. No. 748,206
Int. Cl. C07f 9/12; C09k 3/00
U.S. Cl. 260—974    7 Claims

ABSTRACT OF THE DISCLOSURE

A process for the production of a mixed alkyl aryl phosphate ester, useful as a hydraulic fluid or other functional fluid, which comprises reacting $POCl_3$ and an alkanol at low temperature while purging with nitrogen, thereafter stripping product HCl from the reaction mixture with nitrogen at a temperature of 115°–125° F. under pressure of not more than 100 mm. Hg, the HCl free mixture is designated PCM, followed by reaction of the PCM with an alkali metal arylate to produce the ester.

BACKGROUND OF THE INVENTION

This invention relates to an improved process for preparing neutral mixed alkyl aryl phosphates. More specifically, it relates to an improved process of phosphorylation with phosphorus oxychloride to obtain a dialkylphosphoryl monochloride intermediate which, upon subsequent aroxylation, produces the desired phosphate ester.

In the past, trialkyl phosphates as well as triaryl phosphates have been employed as functional fluids, finding particular use as lubricants, damping fluids, hydraulic force transmission fluids, and bases for greases. Recent times have seen an increased use of neutral mixed alkyl aryl phosphates, both the monoalkyl diaryl esters and the dialkyl monoaryl esters. These materials are preferred over the unmixed compounds for many applications, primarily because of their viscosity and viscosity/temperature characteristics as well as flame resistance; thus, depending upon the particular configurations of the alkyl and aryl groups and the ratios of alkyl to aryl groups in the materials, they may be adjusted to meet various viscosity and temperature demands.

The earliest process for producing the mixed alkyl aryl phosphates consisted of reacting phosphorus oxychloride with various combinations of aryl and alkyl alcohol, either in mixtures or sequentially. A more recent process, the one in commercial use today, comprises a first step of reacting portions of one or more aliphatic alcohols with phosphorus oxychloride to obtain a monoalkyl phosphoryl dichloride, a dialkyl phosphoryl monochloride, or a trialkyl phosphate ester. The substituted phosphoryl chloride is then added to an alkali metal arylate in an aqueous solution. In practice, neither pure dialkylmonoaryl esters nor monoalkyldiaryl esters are obtained, but a mixture containing predominately one or the other with minor portions of trialkyl and triaryl esters.

In the past, two different methods of effecting the phosphorylation reaction were in use. The first process involved reaction of the proper quantity of phosphorus oxychloride and alkanol (e.g., 1:2 or 2:1 ratio) at a temperature below about 70° F. and removing HCl either with gas purging or under vacuum while maintaining the same low temperature. The second method involved maintaining a temperature below about 70° F. during the mixing of the phosphorus oxychloride and alkanol and subsequently raising the temperature not over about 105° F. under high vacuum during the HCl stripping operation. Temperatures were usually held at even lower points during the addition and stripping steps, often as low as 59° F. during reaction and 68° to 77° F. during stripping.

In large volume production utilizing plant equipment and vessels, often as large as 3 to 4 thousand gallons, the reduction of process time in a particular step is often as economically important as yield optimization. Thus, a decrease of 20–50% in process time in a particular reaction step will often make unnecessary the purchase and use of additional equipment, and will result in substantial savings in labor and power. Therefore, when the reaction rate can be reduced without significant effect upon yield, an important advance in a process is often derived.

Either of the necessary two steps in phosphorylation, reaction and stripping, may be attacked in attempting to decrease the reaction time. It has, however, been found that increasing the temperature during the alcohol addition step results in a large increase in the production of by-products, phosphorus acids and pyrophosphates, and a significant loss in yield. Thus, the addition step should take place at 70° to 85° F., preferably from 70° to 80° F. It was heretofore thought that the stripping step was also an unfruitful area for reaction time savings through temperature increases. This was because of the belief that the use of temperatures over about 105° F. during this step would result in a severe loss in yield due to the inherent instability of the phosphoryl chloride species even at temperatures as low as 70° F.

SUMMARY OF THE INVENTION

It has now been found that significant savings in reaction time without concomitant loss in yield in the production of dialkyl phosphoryl chlorides or monoalkyl phosphoryl chlorides may be obtained by employing a process comprising the steps of: (a) adding an appropriate quantity of alkanol to phosphorus oxychloride while maintaining the temperature between about 60° and about 85° F., and (b) subsequently stripping hydrogen chloride from the reaction mixture at a temperature from about 115° to 125° F. under a pressure of not more than 100 mm. Hg.

The amount of alkanol that is added will be from about 1 to 2.8 moles relative to 1 mole of the phosphorus oxychloride.

The temperature of the reaction mixture during the initial alkanol addition is maintained by controlling the rate of incremental addition and by external cooling. After addition of the alkanol, the mixture is allowed to react within the temperature range, for not more than one half-hour, at which time vacuum is applied and the temperature of the mixture is raised to 115°–125° F.

The mixture thus obtained, which may be called a phosphoryl chloride mix, or PCM, is then reacted with an alkali metal arylate by conventional techniques to produce the phosphate ester.

The mixed alkyl aryl phosphates which may be prepared by the process of the invention may be represented by the formula

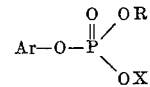

in which Ar is an aryl radical of 6 to 42 carbon atoms, R is an alkyl radical of 1 to 30 carbon atoms, and X is Ar or R.

Ar is a substituted or unsubstituted aryl radical, illustrative examples being phenyl, alkylphenyls such as tolyl, cresyl, etc., anthranyl and like substituted anthranyl radicals, and phenanthryl and substituted phenanthryl radicals. Thus, substitution of the aryl radicals may be by alkyl and alkenyl groups of 1 to 30 carbon atoms, branched and unbranched. Representative branched radicals are those derived from polymerization of 3 to 4 carbon olefins. A particular example is a tetrapropenyl radical which is a four-unit oligomer of propylene. The alkali metal arylate which is reacted with the PCM to form the ester is thus represented by the formula ArO⁻M⁺ in which M⁺ is an alkali metal ion, such as Na⁺, K⁺, Li⁺, etc.

R is an alkyl radical, branched or unbranched, having from 1 to 30 carbon atoms, preferably 2 to 24 carbon atoms, and more preferably 2 to 10 carbon atoms. The alkanol used in the reaction is thus represented by the formula ROH.

The following examples will illustrate the methods of this invention. The examples are merely illustrative and are non-limiting.

EXAMPLE 1

Preparation of phosphoryl chloride mix employing stripping temperatures of 70° F. and 105° F. with nitrogen bubbling (A) A one-liter flask was equipped with a stirrer, dropping funnel, thermometer, nitrogen bubbler controlled with a rotameter, water-cooled condenser, and an ice bath for external cooling. Two Dry Ice traps and a lime absorption column were connected in series with the condenser. 389.5 g. (2.54 moles) of phosphorus oxychloride were charged to the flask. Nitrogen flow was maintained through the liquid at a rate of 464 ml./minute. 395.0 g. (5.33 moles) of normal butanol were added through the dropping funnel as rapidly as possible while maintaining the reaction temperature below 80° F. by regulation of the alcohol addition rate while cooling in the ice bath. The addition required 25 minutes. After the alcohol addition, the mixture was stirred for one half-hour at 80° F. while maintaining the same nitrogen flow rate. The product, which weighed 757.0 g., was divided into two equal portions and treated as follows:

(B) One-half of the product of 1A was placed in a flask equipped with a heating mantle, thermometer, nitrogen inlet, stirrer and a vacuum inlet. This portion was stripped of HCl under a vacuum of 100 mm. Hg for a period of 3 hours at 70° F. with a nitrogen flow rate of 25 ml./minute.

(C) The second half of the product of Example 1A was stripped of HCl under a vacuum of 100 mm. Hg for a period of 3 hours at 105° F. with a nitrogen flow rate of 25 ml./minute, yielding 292.1 g. of phosphoryl chloride mix (PCM) product. Reaction 1C yielded less PCM than 1B because more HCl was removed during the 1C reaction.

EXAMPLE 2

Preparation of phosphoryl chloride mix employing a stripping temperature of 105° F. and no nitrogen bubbling (A) The procedure of Example 1A was followed with the exception that alcohol addition took 30 minutes and no nitrogen purge was used during the reaction.

(B) A portion of the product of 2A was stripped as in 1B at a temperature of about 105° F. with no nitrogen purge during the stripping operation.

(C) A second portion of the product of Example 2A was stripped at a temperature of about 105° F. with no nitrogen purge for a period of 6 hours.

EXAMPLE 3

Preparation of phosphoryl chloride mix employing a stripping temperature of 120° F. and no nitrogen purging (A) The procedure of Example 1A was followed with an alkanol addition time of 30 minutes.

(B) Using all of the product of 3A, the procedure of Example 1B was followed, except that the temperature was raised to about 120° F. and stripping continued for 1½ hours.

EXAMPLE 4

Phenoxylation of phosphoryl chloride mix (PCM)

Each product of Examples 1B and C, 2B and 3B was phenoxylated by the well-known Schotten-Baumann procedure. PCM was added to the proper amount of sodium phenate and sodium hydroxide over a period of about 12 minutes. The amount of sodium phenate required for reaction was determined by the amount of phosphorus oxychloride employed in the sample originally.

The pertinent conditions and results from these examples are summarized in the table following. The yield of each reaction is based upon the percent of phosphorus oxychloride utilization.

TABLE.—PHOSPHORYLATION OF BUTANOL WITH STRIPPING AT TEMPERATURES FROM 70°–120° F.

| Example | Alcohol addition time, hrs. | Stripping temperature, ° F. | Stripping time, hours | Vacuum during stripping, mm. Hg | Nitrogen purge | Yield Based on utilization POCl₃ | R/AR ratio |
|---|---|---|---|---|---|---|---|
| 1B | 0.42 | 70  | 3   | 100 | Yes | 81 | 1.72 |
| 1C | 0.42 | 105 | 3   | 100 | Yes | 80 | 2.00 |
| 2B | 0.50 | 105 | 3   | 100 | No  | 76 | 2.03 |
| 2C | 0.50 | 105 | 6   | 100 | No  | 75 | 2.16 |
| 3B | 0.50 | 120 | 1.5 | 100 | No  | 77 | 2.08 |

NOTE.—R/AR ratio = ratio of alkyl to aryl groups in the phosphate ester.

It may be seen from these data that the yield obtained using a stripping temperature of 120° F. was comparable to that obtained with a stripping temperature of 105° F. with a saving in time of 1.5 hours, or half the stripping time. The data from Examples 1B and 1C, compared with 2B, show that the removal of the nitrogen purge results in some 4% loss in yield. The comparison between 2B and 3B shows that a total time of only 2.5 hours is required for the combined alkanol addition and stripping steps at the 120° F. temperature, compared to a total time for the same operations of 4 hours at the 105° F. temperature while still obtaining the same yield. Thus, this represents a net havings of 37.5% in the time required for phosphorylation. That this can be accomplished without sacrifice of yield is unexpected.

Further, in attempting to achieve a desired degree of reaction, as measured by the R/Ar ratio set forth in the last column of the table, shortening of the stripping period by use of higher temperatures reduces the period of continuing reaction which produces undesirably high R/Ar ratios in the finished esters.

Thus, immediate aroxylation of the PCM should follow the stripping. Alternatively, the mixture may be immediately cooled to a temperature not exceeding about 70° F., at which temperature the material may be stored without serious degradation for considerable periods.

What is claimed is:

1. A process for the preparation of a neutral mixed alkyl aryl phosphate ester of the formula

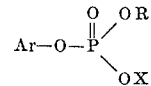

wherein:
Ar is an aryl radical of from 6 to 10 carbon atoms,
R is an alkyl radical of from 2 to 10 carbon atoms, and
X is R or Ar;
which comprises:
  (1) to a quantity of $POCl_3$ incrementally adding from 1 to 2.8 moles of an alkanol of the formula ROH, wherein R is as defined above, per mole of $POCl_3$ thereby forming a plurality of reaction products including HCl, while simultaneously:
   (a) maintaining the temperature of the reaction mixture of ROH, $POCl_3$, and products at a temperature in the range of from 60° F. to 85° F.; and
   (b) continuously purging said reaction mixture with nitrogen;
  (2) maintaining said temperature of from 60° F. to 85° F. and said nitrogen purge for a period of up to 30 minutes following completion of the addition of said alkanol;
  (3) immediately thereafter removing said HCl from said reaction mixture by stripping under a pressure of not more than 100 mm. Hg, with nitrogen at a temperature in the range of from 115° F. to 125° F., to form an HCl-free mixture designated PCM; and
  (4) reacting said PCM with a sufficient quantity of an alkali metal arylate of the formula $ArO^-M^+$, wherein $M^+$ is an alkali metal ion and Ar is as defined above, under Schotten-Baumann reaction procedures, to produce the neutral mixed alkyl aryl phosphate ester.

2. The process of claim 1 wherein Ar is a phenyl radical.

3. The process of claim 2 wherein R is a butyl radical.

4. The process of claim 1 wherein X is R and said mixed alkyl aryl phosphate ester is a dialkyl aryl phosphate ester.

5. The process of claim 1 wherein said alkali metal arylate is a sodium arylate.

6. The process of claim 1 wherein the reaction of PCM and alkali metal arylate immediately follows the stripping of said HCl, and is conducted at a temperature above 70° F.

7. The process of claim 1 wherein immediately following the stripping of said HCl, said PCM is cooled to a temperature not exceeding 70° F. and allowed to remain at that temperature for a period of time prior to said reaction with said alkali metal arylate.

References Cited

UNITED STATES PATENTS 2,656,373    10/1953    Gamrath _____ 260—974 X

FOREIGN PATENTS 328,963    4/1930    Great Britain _____ 260—974

CHARLES B. PARKER, Primary Examiner

A. H. SUTTO, Assistant Examiner

U.S. Cl. X.R.

252—79; 260—964, 965